(12) United States Patent
Salenius

(10) Patent No.: US 11,305,470 B2
(45) Date of Patent: Apr. 19, 2022

(54) METHOD OF MANUFACTURING A MOULDED PRODUCT

(71) Applicant: ATC Holdings Limited, Auckland (NZ)

(72) Inventor: David John Salenius, Auckland (NZ)

(73) Assignee: ATC HOLDINGS LIMITED, Auckland (NZ)

( * ) Notice: Subject to any disclaimer, the term of this patent is extended or adjusted under 35 U.S.C. 154(b) by 463 days.

(21) Appl. No.: 15/753,873

(22) PCT Filed: Aug. 22, 2016

(86) PCT No.: PCT/NZ2016/050134
§ 371 (c)(1),
(2) Date: Feb. 20, 2018

(87) PCT Pub. No.: WO2017/030451
PCT Pub. Date: Feb. 23, 2017

(65) Prior Publication Data
US 2018/0243956 A1 Aug. 30, 2018

(30) Foreign Application Priority Data
Aug. 20, 2015 (NZ) ........................................ 711243

(51) Int. Cl.
*B29C 45/14* (2006.01)
*B29C 44/12* (2006.01)
(Continued)

(52) U.S. Cl.
CPC ........ *B29C 45/14065* (2013.01); *B29C 39/10* (2013.01); *B29C 44/1228* (2013.01);
(Continued)

(58) Field of Classification Search
CPC .... B29C 45/14065; B29C 70/845; E04C 2/26
See application file for complete search history.

(56) References Cited

U.S. PATENT DOCUMENTS 3,646,715 A 3/1972 Pope
3,874,140 A 4/1975 Seehusen
(Continued)

FOREIGN PATENT DOCUMENTS

| CN | 102065715 A | 5/2011 |
|---|---|---|
| EP | 2392741 | 8/2013 |
| FR | 2759721 | 8/1998 |

OTHER PUBLICATIONS

International Patent Application No. PCT/NZ2016/050134, International Search Report dated Nov. 29, 2016.
(Continued)

*Primary Examiner* — Jacob T Minskey
*Assistant Examiner* — Jennifer A Kessie
(74) *Attorney, Agent, or Firm* — Dentons US LLP

(57) ABSTRACT

The present invention relates to methods of manufacturing moulded products, for example building panels, and in particular, but not exclusively, to manufacturing a panel comprising natural stone or rock set into a polymeric layer. The method of manufacturing a moulded product as described herein comprises at least one article being set into a polymeric layer, followed by placing the at least one article and particulate ferrous material in a container so that at least a portion of the or each article is embedded in the particulate ferrous material, introducing a polymeric material into the container to form the moulded product, and removing the moulded product from the container.

27 Claims, 17 Drawing Sheets

(51) Int. Cl.

| | |
|---|---|
| *B29C 39/10* | (2006.01) |
| *B29C 70/84* | (2006.01) |
| *B29C 67/24* | (2006.01) |
| *B29K 709/00* | (2006.01) |
| *B29K 75/00* | (2006.01) |
| *B29L 31/00* | (2006.01) |
| *B29K 105/00* | (2006.01) |
| *B29K 105/16* | (2006.01) |
| *E04C 2/00* | (2006.01) |
| *B63B 21/00* | (2006.01) |
| *B63G 8/00* | (2006.01) |
| *B29C 44/40* | (2006.01) |
| *B63B 1/00* | (2006.01) |
| *B29C 33/16* | (2006.01) |
| *B29K 105/12* | (2006.01) |
| *E04C 2/26* | (2006.01) |
| *E04F 13/08* | (2006.01) |
| *E04F 13/14* | (2006.01) |
| *B29C 44/42* | (2006.01) |
| *B29C 44/08* | (2006.01) |
| *B29K 105/20* | (2006.01) |
| *B29K 105/04* | (2006.01) |

(52) U.S. Cl.
CPC ...... *B29C 45/14786* (2013.01); *B29C 67/246* (2013.01); *B29C 70/845* (2013.01); *E04C 2/26* (2013.01); *E04F 13/0862* (2013.01); *E04F 13/14* (2013.01); *B29C 33/16* (2013.01); *B29C 44/08* (2013.01); *B29C 44/40* (2013.01); *B29C 44/42* (2013.01); *B29K 2075/00* (2013.01); *B29K 2105/0005* (2013.01); *B29K 2105/04* (2013.01); *B29K 2105/12* (2013.01); *B29K 2105/16* (2013.01); *B29K 2105/203* (2013.01); *B29K 2105/251* (2013.01); *B29K 2709/14* (2013.01); *B29K 2995/0003* (2013.01); *B29K 2995/0008* (2013.01); *B29K 2995/0011* (2013.01); *B29K 2995/0063* (2013.01); *B29L 2031/776* (2013.01); *B63B 1/00* (2013.01); *B63B 21/00* (2013.01); *B63G 8/00* (2013.01); *E04C 2002/004* (2013.01); *E04C 2002/008* (2013.01)

(56) References Cited

U.S. PATENT DOCUMENTS

| | | |
|---|---|---|
| 5,061,161 A | 10/1991 | Tetu |
| 8,399,086 B2 | 3/2013 | Itoh et al. |
| 2009/0056257 A1 | 3/2009 | Mollinger et al. |
| 2009/0235600 A1 | 9/2009 | Logan et al. |
| 2011/0030176 A1* | 2/2011 | Itoh .................. A44B 18/0076 24/451 |
| 2013/0338267 A1* | 12/2013 | Appleby ............... B29C 33/301 523/458 |

OTHER PUBLICATIONS

International Patent Application No. PCT/NZ2016/050134, Written Opinion of the International Searching Authority dated Nov. 29, 2016.

International Patent Application No. PCT/NZ2016/050134, International Preliminary Report on Patentability dated Dec. 11, 2017.

* cited by examiner

METHOD OF MANUFACTURING A MOULDED PRODUCT

CROSS-REFERENCE TO RELATED APPLICATIONS

This application is the U.S. national phase of International Application No. PCT/NZ2016/050134 filed on Aug. 22, 2016, which application claims priority to New Zealand Patent Application No. 711243 filed on Aug. 20, 2015, the contents each of which are incorporated herein by reference.

The present invention relates to methods of manufacturing moulded products, for example building panels, and in particular, but not exclusively, to manufacturing a panel comprising natural stone or rock set into a polymeric layer. The panel may be used with other like panels to clad a building or structure, and may also include edge formation to facilitate engagement between panels.

BACKGROUND ART

Natural stone is a popular decorative surface for dwellings and the like. However, the cost of using skilled stonemasons to lay the stone is often prohibitive.

One proposed solution has been to provide moulded panels which are shaped and coloured to give the appearance of natural stone. However, many people dislike the use of artificial materials.

Another solution has been to use epoxy to join pieces of stone together. This has the advantage that the stones are pre-formatted, but typically still requires expensive pre-cladding supply and installation, mortar adhesive, and the use of a stonemason or tiler to install the stone. The preformatted stone is typically sold in relatively small units, which means that a large number of joins between the courses can be seen.

The reference to any prior art in the specification is not, and should not be taken as, an acknowledgement or any form of suggestion that the prior art forms part of the common general knowledge in any country.

OBJECT OF THE INVENTION

It is an object of a preferred embodiment of the invention to provide a building panel and/or a method of manufacturing the panel and/or a method manufacturing a moulded product which will overcome or ameliorate problems with such panels or methods at present, or which will at least provide a useful choice.

Other objects of the present invention may become apparent from the following description, which is given by way of example only.

SUMMARY OF THE INVENTION

According to one aspect of the present invention there is provided a method of manufacturing a moulded product comprising at least one article set into a polymeric layer, the method comprising the steps of:
i) placing the at least one article and particulate ferrous material in a container so that at least a portion of the or each article is embedded in the particulate ferrous material to a predetermined depth;
ii) introducing a polymeric material into the container to form the moulded product; and
iii) removing the moulded product from the container.

Preferably the step of introducing the polymeric material into the container comprises placing the container into a mould tool.

Preferably the container comprises a mould tool.

Preferably the container is placed into a mould tool prior to introducing the polymeric material.

Preferably the container can be transferred or inverted into a mould tool prior to introducing the polymeric material.

Preferably the method comprises the step of laying the at least one article in a desired pattern or position on a template prior to the step of placing the at least one article in the container.

Preferably the step of introducing particulate ferrous material into the container comprises the step of locating or activating a magnetic source beneath the container to embed the decorative elements into the particulate ferrous material.

Preferably the step of introducing particulate ferrous material into the container comprises the step of vibrating the container.

Preferably the method comprises positioning a plurality of articles in the container, the method further comprising the step of positioning a spacing material between at least two adjacent articles prior to the step of introducing the polymeric material into the container.

Preferably the method comprises the step of positioning a tension member over the articles prior to the step of introducing the polymeric material into the container.

Preferably the tension member is adhered to the articles.

Preferably the tension member comprises a plurality of cables and/or a mesh.

Preferably the method comprises heating the at least one article to between 35-50° C. between the step of introducing the particulate ferrous material into the container and the step of introducing the polymeric material into the container.

Preferably mesh comprises at least one fixing means.

Preferably the moulded product is a building panel.

Preferably the article is a decorative element.

Preferably the particulate ferrous material comprises iron sand.

Preferably the step of locating or activating a magnetic source beneath the mould comprises the step of activating an electromagnet. Alternatively the step of locating or activating a magnetic source beneath the mould comprises the step of moving magnetic material beneath the mould.

Preferably the mould is a closed mould.

Preferably the step of introducing the polymeric material into the mould comprises the step of injecting the polymeric material into the mould. Alternatively the step of introducing the polymeric material into the mould comprises the step of pouring or spraying the polymeric material into the mould.

Preferably the polymeric material comprises polyurethane.

Preferably the filler material comprises one or more of glass fibres, glass flake, chopped roving, mica, quartz, calcium carbonate, silica sand, sand or aluminum oxide.

According to a further aspect of the present invention there is provided a method of manufacturing a moulded product comprising at least one article set into a polymeric layer, the method comprising the steps of:
i) Placing the at least one article in a container and introducing particulate ferrous material into the container so that at least a portion of the or each article is embedded in the particulate ferrous material; or
ii) introducing particulate ferrous material into a container and placing the at least one article into the container so that at least a portion of the or each article is embedded in the particulate ferrous material;

the method further comprising the steps of:

iii) locating or activating a magnetic source beneath the container;

iv) introducing a polymeric material into the container; and v) removing the product from the container.

According to a further aspect of the present invention there is provided a method manufacturing a moulded product comprising at least one article set into a polymeric layer, the method comprising the steps of:

i) embedding at least one article to a predetermined depth in a bed of particulate ferrous material provided in a mould;

ii) locating or activating a magnetic source beneath the mould;

iii) introducing a polymeric material into the mould; and iv) removing the product from the container.

Preferably the moulded product is a building panel.

Preferably the article is a decorative element.

Preferably the particulate ferrous material comprises iron sand.

Preferably the step of locating or activating a magnetic source beneath the mould comprises the step of activating an electromagnet. Alternatively the step of locating or activating a magnetic source beneath the mould comprises the step of moving magnetic material beneath the mould.

Preferably the mould is a closed mould.

Preferably the step of introducing the polymeric material into the mould comprises the step of injecting the polymeric material into the mould. Alternatively the step of introducing the polymeric material into the mould comprises the step of pouring or spraying the polymeric material into the mould.

Preferably the polymeric material comprises polyurethane.

Preferably the filler material comprises silica sand.

Preferably the filler material comprises glass fibres.

In one embodiment the method comprises the step of positioning a backing layer above the at least one decorative element, and the method comprises filling a void space between the backing layer and the at least one decorative element with the polymeric material.

Preferably the backing layer is provided with a tension member, and at least one fixing means is connected to the tension member.

Preferably a first portion of the tension member is connected to the backing layer and a second portion is not connected to the backing layer.

Preferably the method comprises the step, prior to the step of introducing the polymeric material into the mould, of locating the second portion of the tension member and the at least one fixing means such that the second portion of the tension member is embedded in the polymeric material when the material has set or cured.

Preferably the tension member comprises a mesh.

Preferably the backing layer comprises keying portions which are shaped to provide a mechanical connection between the polymeric material and the backing layer when the polymeric material has set or cured.

Preferably the backing layer has a density which is greater than a density of the polymeric material.

Preferably the density of the backing layer is substantially twice the density of the polymeric material.

Preferably the backing layer comprises a second polymeric material.

Preferably the second polymeric material comprises polyurethane.

Preferably the method comprises the step of forming the backing layer by introducing the second polymeric material into a backing layer mould and setting the second polymeric material.

Preferably the step of forming the backing layer comprises the step of embedding the first portion of the tension member in the backing layer.

Preferably the at least one decorative element comprises a stone or rock.

Preferably the method further comprises moulding an edge formation into one or more edges of the moulded product.

Preferably the edge formation comprises a tongue or a groove.

According to another aspect of the present invention there is provided a building panel produced by the method of the first or second aspects of the invention.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

According to a still further aspect of the present invention, a building panel and/or a method of manufacturing a building panel is substantially as herein described, with reference to the accompanying drawings.

Further aspects of the invention, which should be considered in all its novel aspects, will become apparent from the following description given by way of example of possible embodiments of the invention.

BRIEF DESCRIPTION OF PREFERRED EMBODIMENTS OF THE INVENTION

Figure 1:
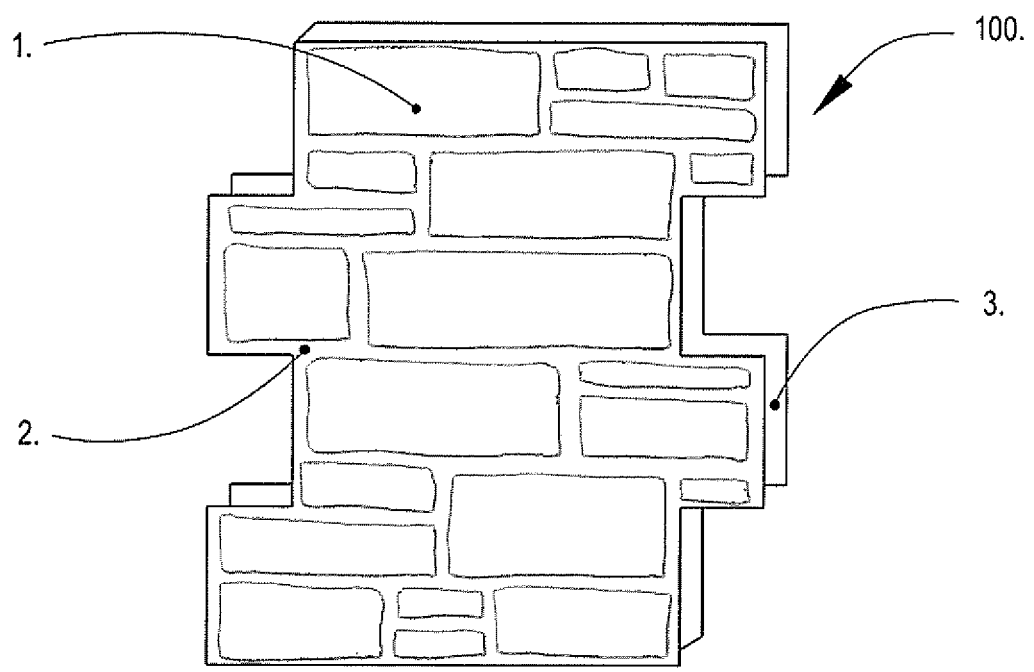
FIG. 1 is a front view of a building panel according to one embodiment of the invention.

Referring first to FIG. 1, a building panel made in accordance with a method of the present invention is generally referenced by arrow 100. The panel 100 comprises at least one, and more preferably a plurality of decorative elements 1 set into a backing layer 2, as is described further below.

One embodiment of the method of manufacturing the building panel 100 is described below.

Figure 2:
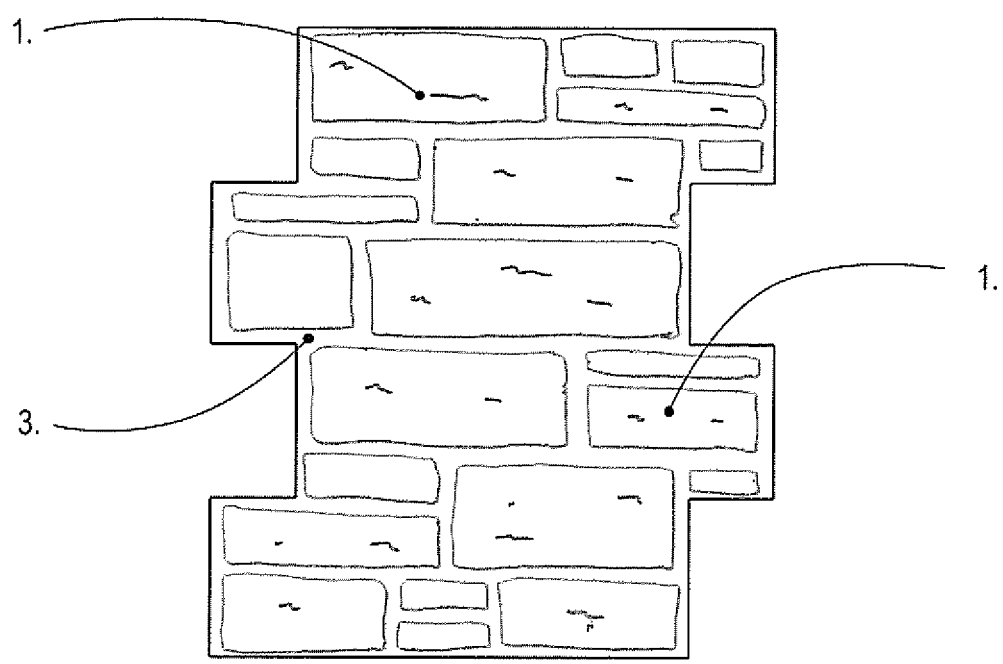
FIG. 2 Is a top view of a template with a plurality of decorative elements laid on top of the template.

Referring first to FIG. 2, in a first step the decorative elements 1 are set out in a required pattern on a template 3. The decorative elements 1 are preferably set out face up.

In a preferred embodiment the decorative elements 1 are simply placed on the template 3, and are not secured to the template 3 in any way.

Figure 3:
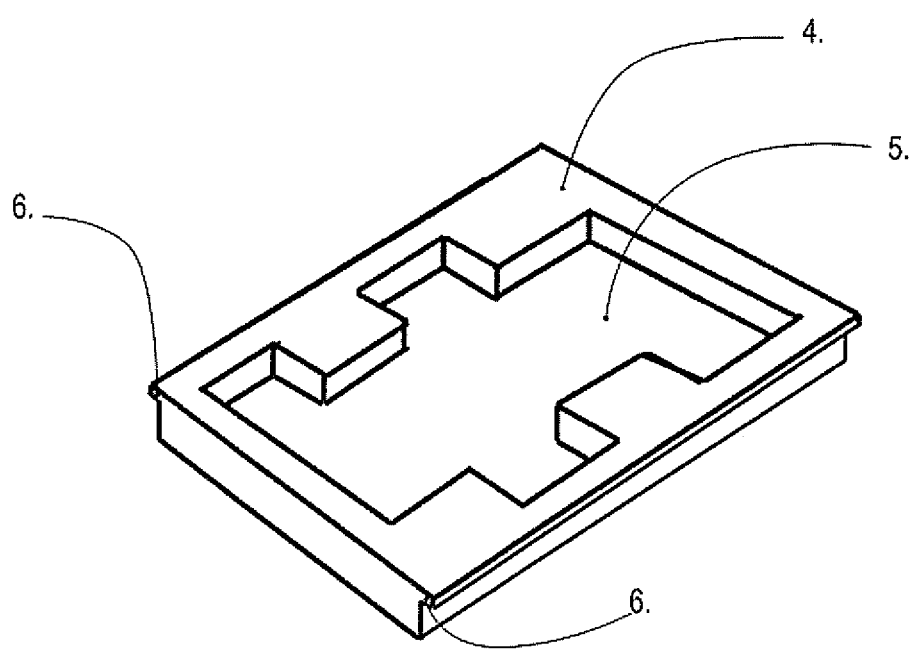
FIG. 3 is a perspective view of a container

Referring next to FIG. 3, a container 4 is shown. The container 4 has recess 5 which has an outline which is a mirror image of the template 3. The container 4 is preferably also provided with flanges 6 on opposite sides of the container.

Once the decorative elements 1 have been laid out in a suitable pattern, the container 4 is placed over the template 3 such that the recess 5 fits over the decorative elements 1. The depth of the recess 5 is less than the depth of the decorative articles 2, and so the container 4 can be held tightly against the decorative elements 1. The template 3 and container 4 are then inverted so that the decorative elements 1 are lying inside the container 4 and the template 3 is removed. The arrangement of the decorative elements 1 is generally maintained during this process, although small realignments of the decorative elements may be required.

Figure 4:
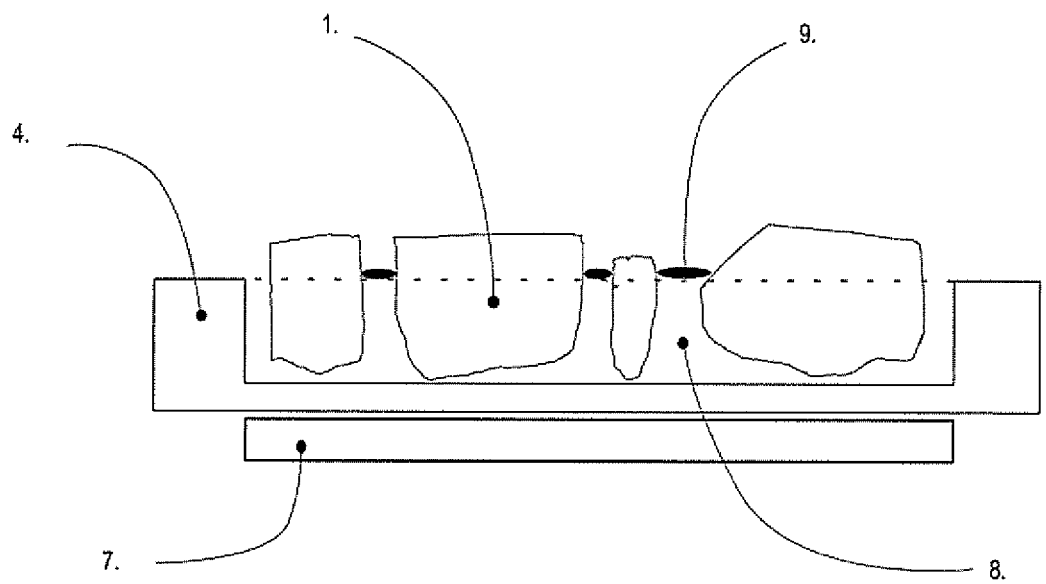
FIG. 4 is a cross-section of the container of FIG. 3 positioned above a magnet, with the decorative elements in position

Referring next to FIG. 4, a particulate magnetic material, such as a particulate ferrous material, for example iron sand, is brushed into the spaces between adjacent decorative elements 1, and between the decorative elements 1 and the sides of the container 4. In one embodiment the container 4 is then positioned adjacent to or over a magnet 7 prior to particulate ferrous material being added, although in other embodiments this step may be omitted.

The container 4 (and magnet 7 if used) may be vibrated during this process. By this process the decorative elements 1 are embedded in the particulate ferrous material 8 to a predetermined depth, corresponding to the amount of the decorative element which is to protrude from the backing layer 2 in the finished panel 100. A spacing material such as a settable or mouldable material, for example a putty 9 may also be placed between adjacent decorative articles 1 in order to maintain their relative spacing. This may assist in maintaining the relative spacing between the decorative elements 1 before they are set into the polymer matrix, and may also assist in reducing "creep" when the panels are in use.

Figure 5:
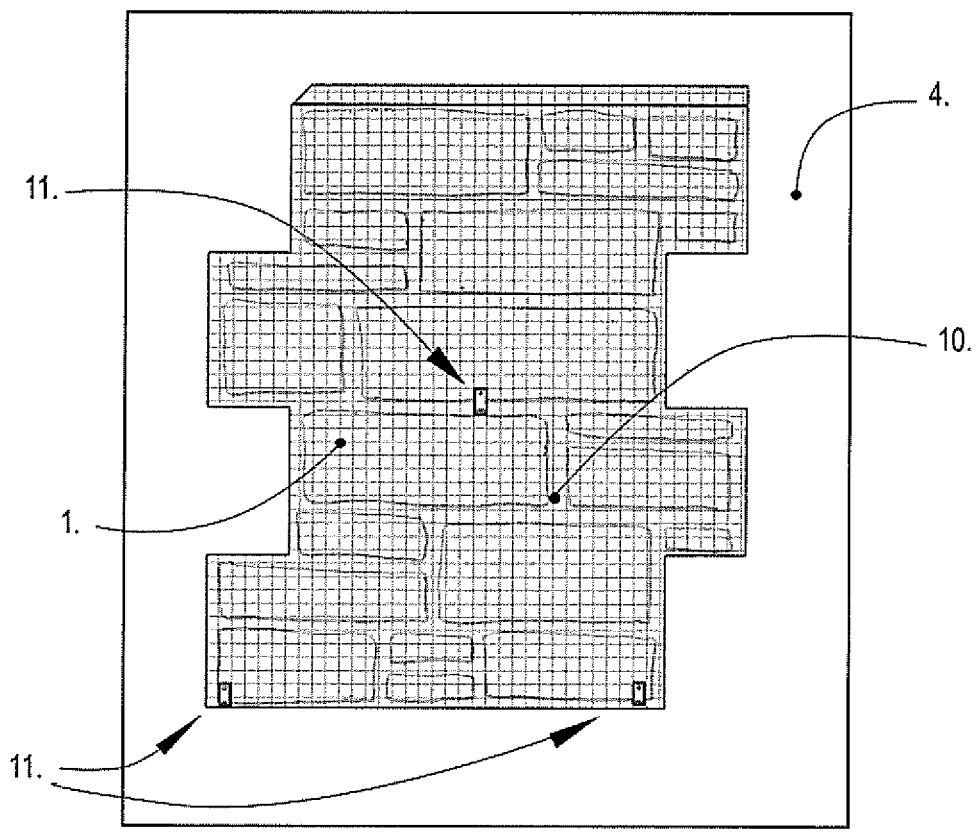
FIG. 5 is a top view of the container and decorative elements with a mesh laid in position.
Figure 6:
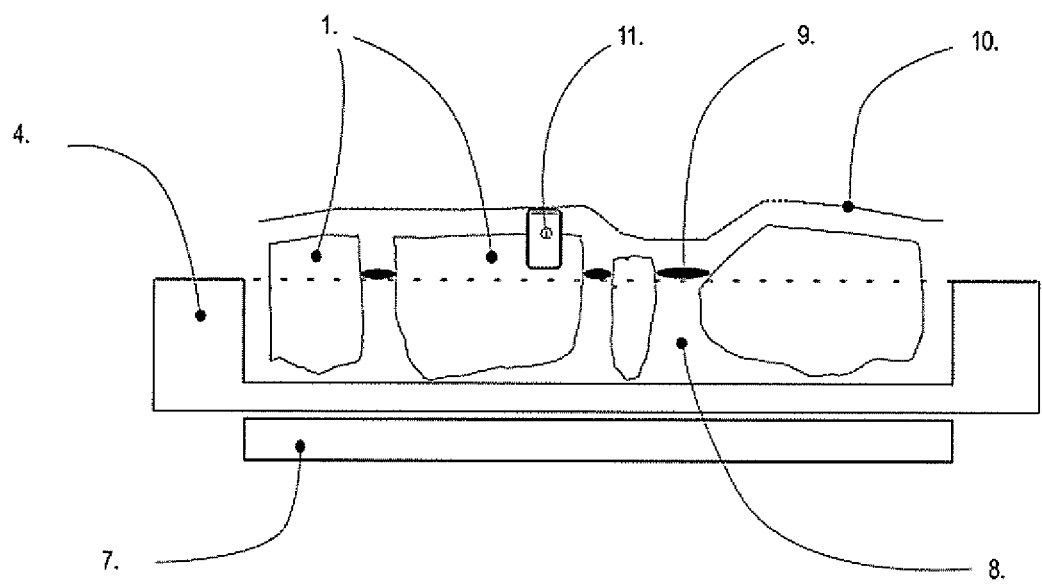
FIG. 6 is a cross-section side view and decorative elements shown in FIG. 5

Referring next to FIG. 5, a tension member, which in one example is provided in the form of a mesh 10, is laid over or about the decorative elements 1. In one embodiment a removable frame (not shown) may be placed over the container to assist in aligning the mesh. The tension member may alternatively comprise one or more lengths of material such as strips or cables or wires. In a preferred embodiment a plurality of substantially "L" shaped fixing means 11 are attached to the mesh 10 and are spaced so as to fit in spaces between the decorative elements 1. The mesh 10 may be connected to the back of the decorative elements 1 with a suitable adhesive or putty, in order to keep it in position until the polymer matrix is formed. The removable frame (if used) may now be removed. In this state the assembly may be referred to as a pre-form. A cross-section side view including the decorative elements shown in FIG. 5 is provided in more detail in FIG. 6.

Figure 7:
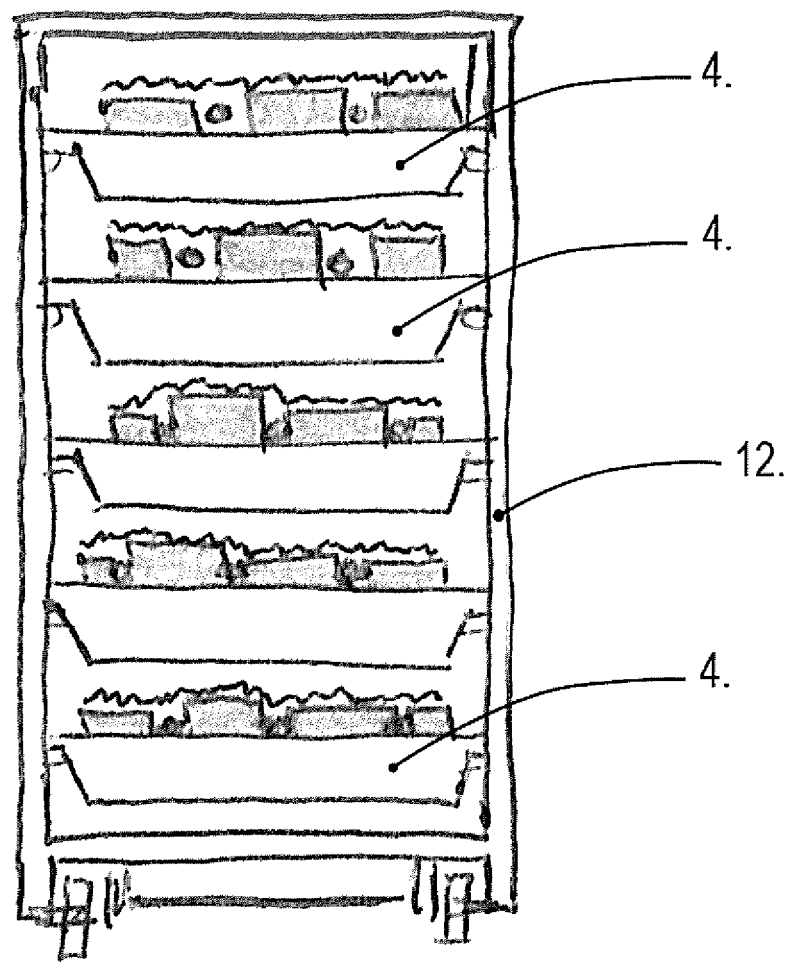
FIG. 7 shows a number of container pre-forms stored in a rack.

The container 4 may next be preheated to 35-50° C. then moved straight to the plastic injection stage described below, or it may be stored while the process described above is used to fill one or more further containers. In one embodiment a plurality of containers 4 are stored in a suitable rack 12 prior to the plastic injection stage, as shown in FIG. 7. Alternatively, the plurality of containers can be placed in compression on a conveyor belt (not shown) to control the production speed/flexibility of the process, if required. In a preferred embodiment the pre-forms are heated by storing them at a temperature of around 35-50° C. overnight, or for a minimum of 5 hours, prior to the injection step.

Figure 8:
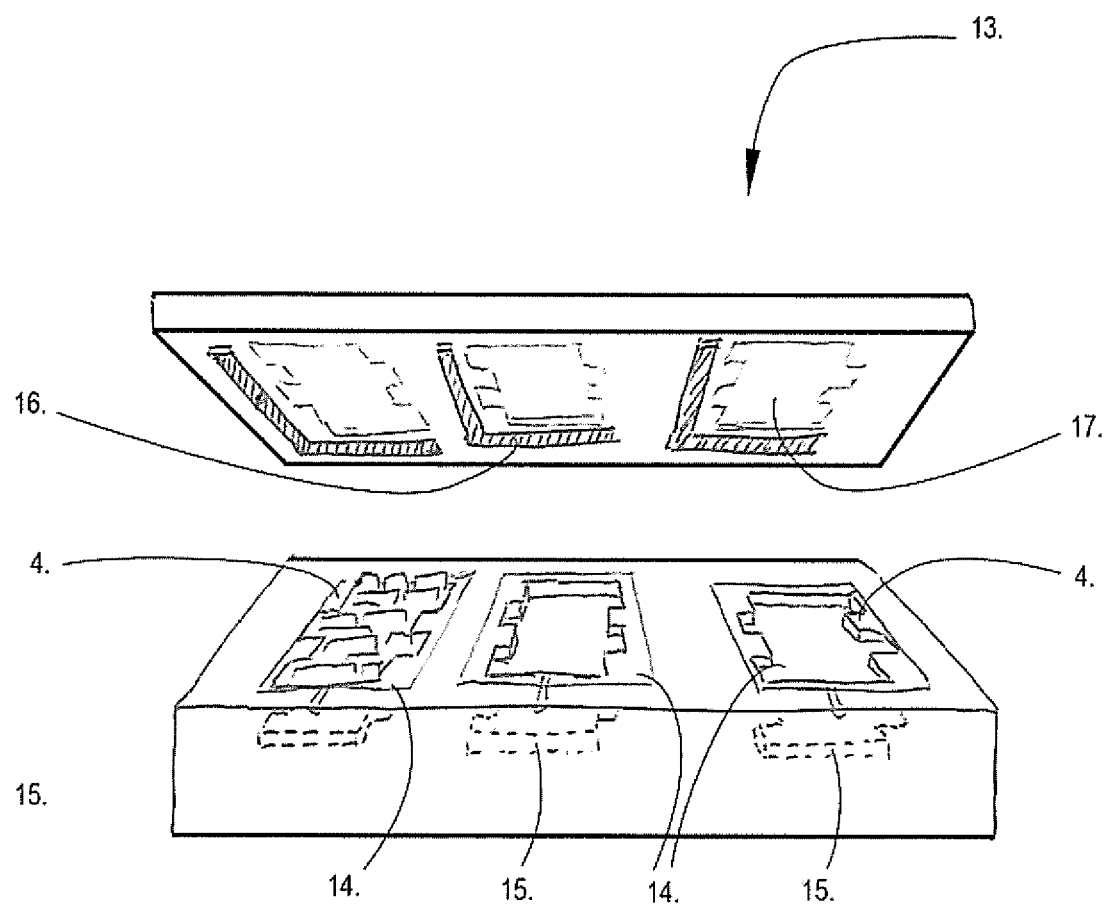
FIG. 8 shows a mould tool with three pre-forms in position.
Figure 9:
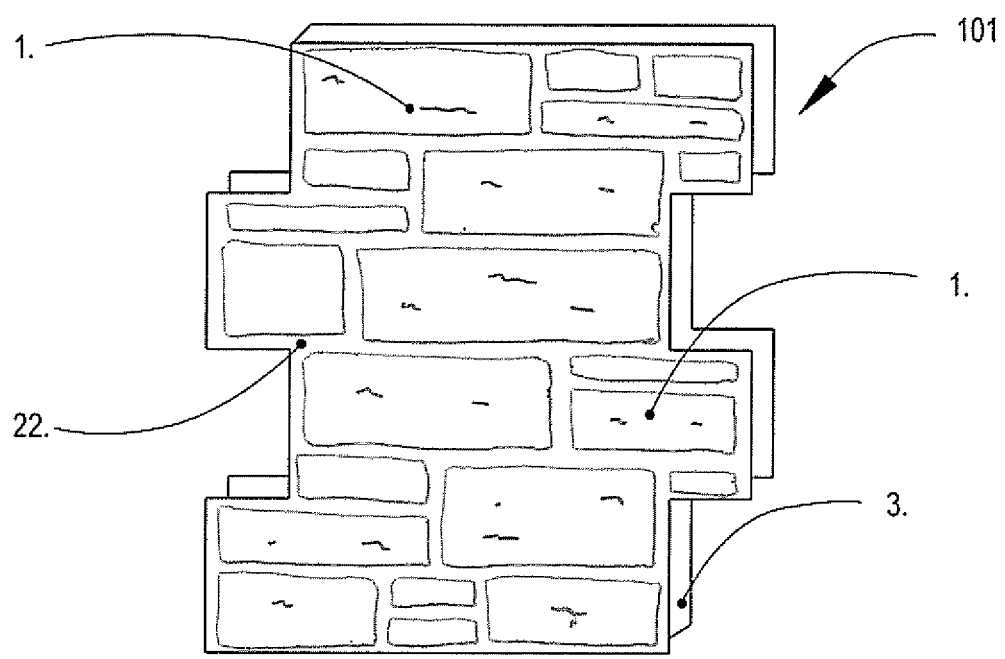
FIG. 9 is a front view of a building panel according to another embodiment of the invention
Figure 10:
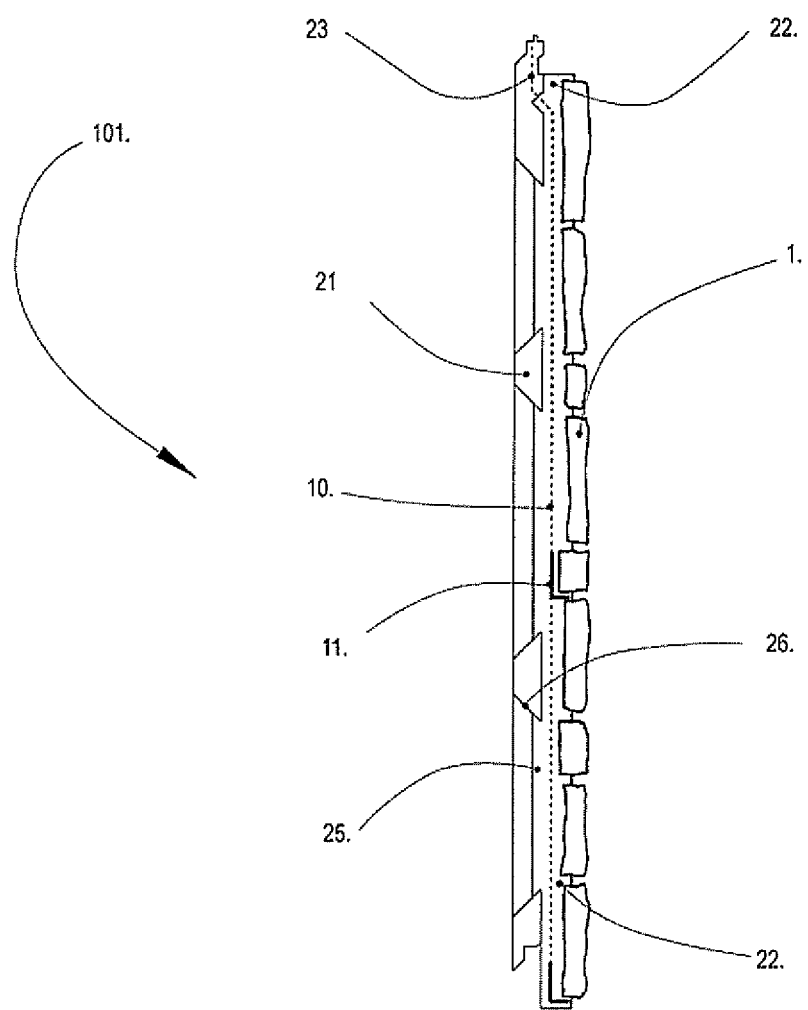
FIG. 10 is a cross-section side view of the panel of FIG. 9.
Figure 11:
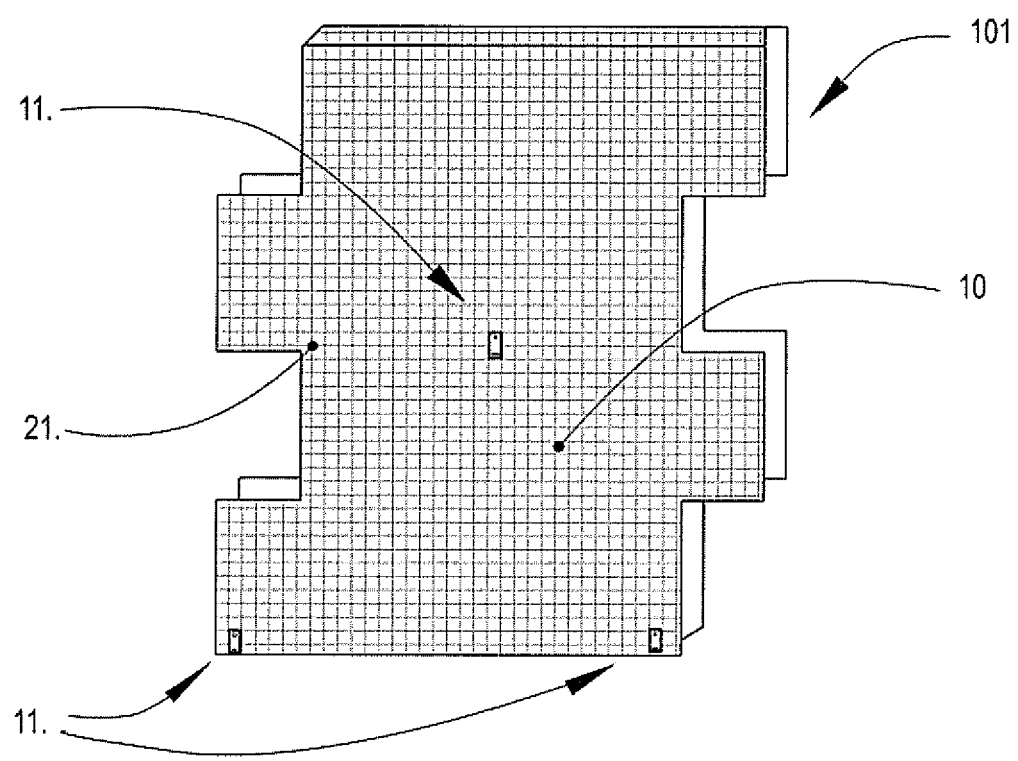
FIG. 11 is a front view of the panel with the decorative elements and second layer removed for clarity.
Figure 12:
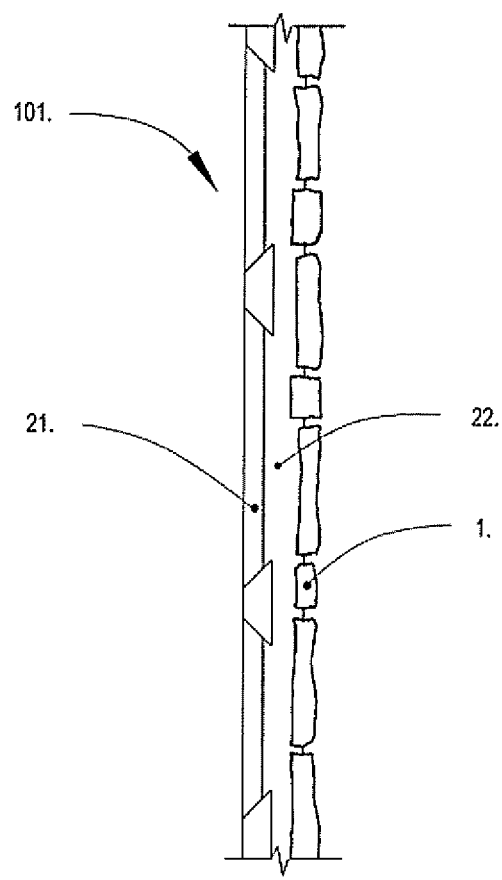
FIG. 12 is an end view of the panel of FIG. 9

Referring next to FIG. 8, a mould tool is generally referenced by arrow 13. The tool 13 has at least one, and more preferably a plurality, of recesses 14, each of which is shaped to receive a container 4.

The mould tool 13 is arranged such that a suitably shaped magnet (or electromagnet) is provided beneath each recess 14, or at least so that one can be placed there when required.

In some embodiments the side edges of the panel 100 are shaped with an undercut. The tool 13 may be provided with sliding side portions 16 which form the undercut, and which can be withdrawn into the walls of the tool to allow the panel 100, once formed, to be removed from the tool. Alternatively, separate inserts (not shown) may be used to form the undercut, if required.

Prior to injection of the polymeric material into the mould, the inside of the lid 17 and the inserts (if provided) may be waxed.

With the magnets 15 in position and energised, the polymer (typically Reaction Injection Moulding (RIM) or Reinforced Reaction Injection Moulding (RRIM) polyurethane) is injected into the mould cavity. The presence of the magnetic field generated by the magnets 15 ensures that the particulate material stays in position, and that it is not disturbed by the injection of the polymer.

Once the polymer has set or cured to a sufficient degree, the sliding portions 16 (if provided) are withdrawn and the lid opened. A lifting means, for example a hydraulic ram (not shown), lifts the container 4 and panel 100 from the recess 14.

The panel 100 is then removed from the container 4, preferably with the magnets 15 still in position/activated. Leaving the magnets activated during this stage ensures that the particulate material falls from the face of the panel 100 into the container 4.

The magnets 15 may then be de-energised/removed and the finished panel may be moved to a heat controlled environment (for example at around 35-50° C.) for a required period until the setting or curing process is complete.

In embodiments in which separate inserts are used to shape an undercut, a slightly different process may be used to remove the panel from the tool.

Here, the lid 17 is opened only a small amount, for example 15 mm, and the particulate material is vibrated from the face of the panel. The lid is then fully opened and the insert removed, before the panel is moved to the heat controlled environment.

In another embodiment (not shown) the decorative elements may be laid directly into the container 4, rather than first being laid out on the template. The particulate ferrous material may be introduced into the container either before or after the decorative elements. In this embodiment the mould tool may define the container, rather than the container being removable from the mould tool.

Referring first to FIGS. 9-12, a building panel according to a second embodiment of the present invention is generally indicated by arrow 101.

The panel 101 comprises a backing layer 21 connected to a second layer 22. A plurality of decorative elements 1 are embedded in the second layer 22.

A tension member, typically a mesh 10, is connected to the backing layer 21. The mesh 10 is provided with at least one fixing means 11, more preferably a plurality of fixing means 11.

In a preferred embodiment the backing layer and second layer are formed from a polymeric material, preferably a polyurethane foam. In the embodiment shown a first portion 23 of the mesh 10 is embedded in the backing layer 21, and a second portion 24 of the mesh is embedded in the second layer 22, as is described further below. The fixing means 11 are also preferably also embedded in the second layer 22.

The first portion 23 of the mesh 10 is preferably embedded in the backing layer 21 at or adjacent the top of the backing layer 21.

The second layer 22 is preferably provided with at least one keying portion 25 which assists to prevent relative movement between the backing layer 21 and the second layer 22 in the plane of the panel 101 and preferably also assists in preventing separation of the backing layer 21 from the second layer 22. In a preferred embodiment each keying formation 25 may engage an inwardly tapered portion of an aperture 26 provided in the backing layer 21.

Referring next to FIGS. 13-17 a method of manufacturing the panel 101 is described.

Figure 13:
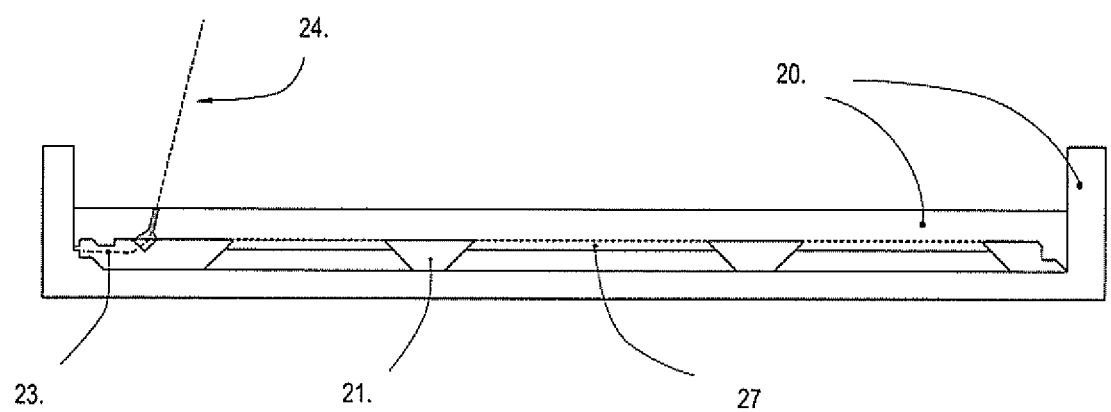
FIG. 13 is a cross-section side view of a backing layer in a mould.
Figure 14:
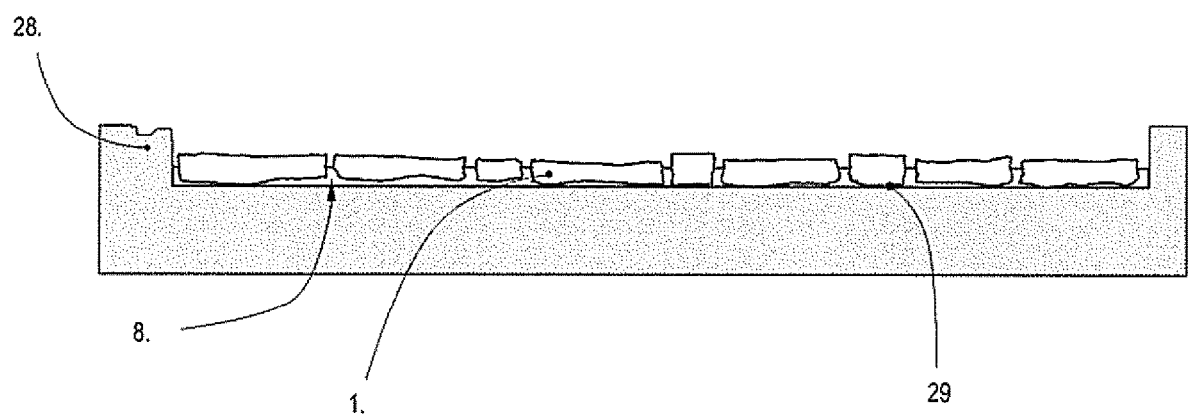
FIG. 14 is a cross-section side view of second mould with decorative elements laid in bed of sand.

Referring first to FIG. 13, the backing layer 21 is prepared by injecting a suitable polymeric material into a mould 20. The mould 20 is preferably proved with suitable void formers 27 to form the apertures 26 referred to above. A cross-section side view of second mould 28 with decorative elements 1 laid in bed of iron sand 8 is shown in FIG. 14.

The mesh 10 is preferably located such that a first portion 23 is within the material of the backing layer, and a second portion 24 is held clear of the polymeric material.

Figure 15:
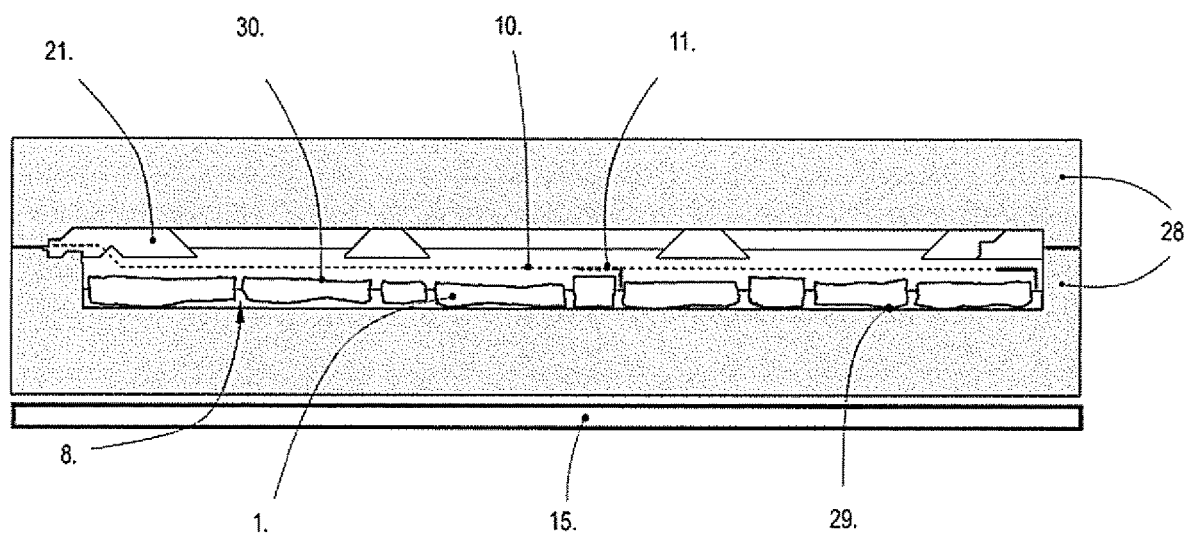
FIG. 15 is a cross-section side view of the mould of FIG. 14 with the backing layer laid in position.

Referring next to FIG. 15, a mould 28 is partially filled with a particulate ferrous material, preferably iron sand 8. One or more decorative elements 1 are laid in the mould 28 in a desired pattern. The decorative elements 1 are pressed or settled in to the bed of iron sand such that a lower surface 29 (the front surface of the finished panel) of each decorative element 1 is buried below the surface of the iron sand 8.

Figure 16:
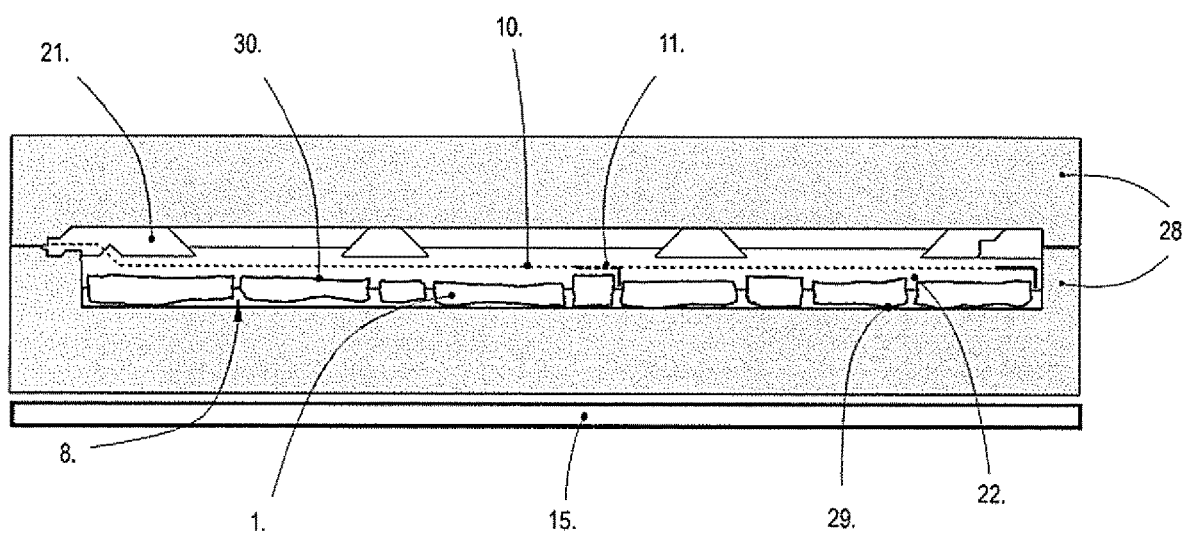
FIG. 16 is a cross-section side view of the mould of FIG. 7 after the polymeric material has been injected into the mould.

Referring next to FIG. 16, with the decorative elements 1 in position, the backing layer 21 is positioned inside the mould 28. The mesh 10 is positioned across the upper surfaces 30 of the decorative elements 1 and the fixing means 11 are positioned between the decorative elements 1.

With the backing layer 21, mesh 10 and fixing means 11 in position, a magnetic source 15 (typically an electromagnet) is activated below the mould 28. In an alternative embodiment one or more permanent magnets are moved into position below the mould 28.

With the magnetic source 15 activated (or moved into position, as the case may be), liquid polymeric material is injected into the void space between the backing layer 21 and the decorative elements 1 to form the second layer 22 of the panel (see FIG. 16). Once the polymeric material has set or cured the panel 101 can be removed from the mould.

In another embodiment (not shown) the decorative elements 1 may be connected to the mesh 10 (for example by use of a suitable adhesive) prior to the backing layer 21 being positioned in the mould 28. This may increase productivity by allowing the relatively time consuming process of determining the layout of the decorative elements to be performed remotely from the mould.

In preferred embodiments the polymeric material used for the second layer 22 may be a polyurethane foam. In a preferred embodiment the density of the foam used for the second layer 22 is less than that used for the backing layer 21. In one embodiment the material of the backing layer is substantially twice the density of that used in the second layer. The second layer may comprise low density fillers such as silica sand and/or glass fibres to reduce its density.

Figure 17:
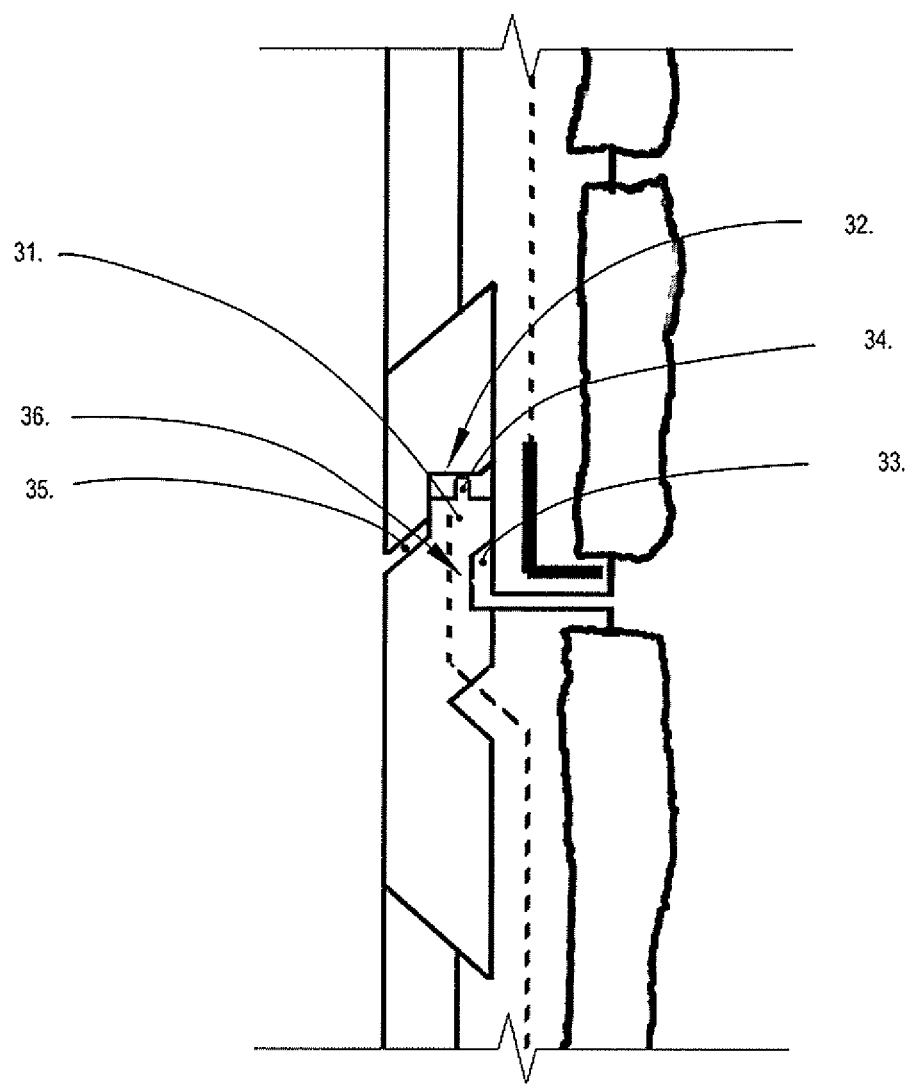
FIG. 17 is a cross-section side view of a tongue and groove formation according to an embodiment of the invention.

Referring next to FIG. 17, an enlarged cross-section view of a joint between two adjacent panels 102 according to an embodiment of the invention is shown. The joint formation may be used in panels formed by any of the methods described above.

Each panel 102 comprises an edge formation such as a tongue formation 31. The tongue formation 31 is provided on one side of the panel 102, and is preferably also provided at one end. The tongue formation 31 is adapted to engage another edge formation such as a complimentary groove formation 32 which is also provided on an opposite side of the panel 102 to the tongue formation 31, and at the opposite end of the panel. In one embodiment the edge formation can be provided to ensure a complete overlap around the perimeter of the panel with other like panels.

The tongue formation 31 comprises a recessed portion 33. The recessed portion 33 is preferably sufficiently recessed to accommodate the head of a screw fastener. In a preferred embodiment the recessed portion is recessed sufficiently deeply to act as a capillary break. In one example the recessed portion is recessed substantially 4 mm.

A nib 34 is provided at the end of the tongue portion 31. The nib 34 preferably takes the form of a thin raised rib which extends along the tongue 31 down the edge of the panel. The thin nib 34 is compressible when the panel expends due to thermal expansion, and also reduces the friction between adjacent panels when the panels are being mounted, and minimises interference of particle contaminants that may otherwise bind in the joint and stop the panels from locating smoothly.

The groove 32 is preferably provided with an expanded mouth portion 35 in order to assist in engaging the tongue 31 of one panel with the groove portion 32 of another panel in use.

In preferred embodiments the tongue formation 31 may be provided with a shallow groove 36 to assist with locating the end of the fasteners when the panel is being fastened to a substrate.

This joint configuration may be used with either of the panels 100, 101 described above.

Those skilled in the art will appreciate that the moulding methods described above may be used to manufacture products other than building panels. In addition, any suitable article, rather than purely decorative elements, may be embedded in the sand and thereby incorporated into the moulded product. The moulded product may provide a panel such as a wall panel that may be assembled with other like panels to form a covering such as a decorative cladding for a building or a similar structure.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the invention.

The invention claimed is:

1. A method of manufacturing a building panel as a moulded product comprising at least one article, wherein the article is a decorative element set into a polymeric layer, the method comprising:
   partially filling a container with particulate ferrous material,
   placing the at least one article in the container so that at least a portion of the or each article is embedded in the particulate ferrous material to a predetermined depth so that a surface of the or each article is buried below a surface of the particulate ferrous material,
   positioning a tension member over or about the articles,
   introducing a polymeric material into the container to form the moulded product, and
   removing the moulded product from the container to yield the building panel.

2. The method as claimed in claim 1 wherein introducing the polymeric material into the container comprises placing the container into a mould tool.

3. The method as claimed in claim 1 wherein the container comprises a mould tool.

4. The method as claimed in claim 1 further comprising laying the at least one article in a desired pattern or position on a template prior to placing the at least one article in the container.

5. The method as claimed in claim 1 further comprising locating or activating a magnetic source adjacent to the container to embed the at least one decorative elements into the particulate ferrous material.

6. The method as claimed claim 1 further comprising vibrating the container prior to introducing the polymeric material.

7. The method as claimed claim 1 further comprising positioning a plurality of articles in the container, the method further comprising positioning a spacing material between at least two adjacent articles prior to the step of introducing the polymeric material into the container.

8. The method as claimed in claim 7 wherein the spacing material comprises one or more of glass fibres, glass flake, chopped roving, mica, quartz, calcium carbonate, silica sand, sand or aluminum oxide.

9. The method as claimed in claim 1 further comprising the step of adhering the tension member to the articles.

10. The method as claimed in claim 9 wherein the tension member comprises a plurality of cables and/or a mesh.

11. The method as claimed in claim 1 further comprising the step of heating the at least one article prior to introducing the polymeric material into the container.

12. The method as claimed in claim 10 wherein at least one fixing bracket is attached to the mesh, and each at least one fixing bracket is spaced so as to fit in respective spaces between the decorative elements.

13. The method as claimed in claim 5 wherein locating or activating the magnetic source comprises activating an electromagnet.

14. The method as claimed in claim 11 further comprising introducing the polymeric material into the container by injecting the polymeric material into the-container.

15. The method as claimed in claim 1, wherein
   partially filling the container with particulate ferrous material results in forming a bed of particulate ferrous material that does not completely fill the container, and
   at least a portion of the or each article is embedded in the bed of the particulate ferrous material to a predetermined depth so that a surface of the or each article is buried below a surface of the bed of the particulate ferrous material.

16. The method as claimed in claim 1, wherein the decorative element comprises a rock or stone.

17. The method as claimed in claim 1, further comprising:
   positioning or activating a magnetic source beneath the mould prior to introducing the polymeric material into the mould.

18. The method as claimed in claim 17, wherein the positioning or activating of the magnetic source beneath the mould comprises activating an electromagnet.

19. The method as claimed in claim 17, wherein introducing the polymeric material into the mould comprises injecting the polymeric material into the mould.

20. The method as claimed in claim 1, further comprising at least one fixing means connected to the tension member.

21. The method as claimed in claim 20, further comprising a first portion of the tension member connected to a backing layer and a second portion not connected to the backing layer.

22. The method as claimed in claim 21, further comprising, after introducing the polymeric material into the mould, positioning the second portion of the tension member and the at least one fixing means such that the second portion of the tension member is embedded in the polymeric material when the polymeric material has set or cured.

23. The method as claimed in claim 21, wherein the backing layer comprises keying portions which are shaped to provide a mechanical connection between the polymeric material and the backing layer when the polymeric material has set or cured.

24. The method as claimed in claim 23, wherein the backing layer has a density which is greater than the density of the polymeric material.

25. The method as claimed in claim 24, further comprising forming the backing layer by introducing a second polymeric material into a backing layer mould and setting the second polymeric material.

26. The method as claimed in claim 25, further comprising embedding the first portion of the tension member in the backing layer.

27. The method as claimed in claim 17, further comprising moulding an edge formation into one or more edges of the moulded product, wherein the edge formation comprises a tongue or a groove.

* * * * *